US012632026B2

(12) United States Patent
      Glück

(10) Patent No.: US 12,632,026 B2
(45) Date of Patent: May 19, 2026

(54) METHOD FOR INTEGRATION AND COORDINATION OF MEASUREMENT AND/OR CONTROL SYSTEMS

(71) Applicant: Thomas Glück, Munich (DE)

(72) Inventor: Thomas Glück, Munich (DE)

( * ) Notice: Subject to any disclaimer, the term of this patent is extended or adjusted under 35 U.S.C. 154(b) by 701 days.

(21) Appl. No.: 17/914,913

(22) PCT Filed: Apr. 9, 2021

(86) PCT No.: PCT/EP2021/059296
      § 371 (c)(1),
      (2) Date: Sep. 27, 2022

(87) PCT Pub. No.: WO2021/209336
      PCT Pub. Date: Oct. 21, 2021

(65) Prior Publication Data
      US 2023/0135225 A1      May 4, 2023

(30) Foreign Application Priority Data

Apr. 17, 2020    (EP) ..................................... 20170082

(51) Int. Cl.
      *G05B 19/042*          (2006.01)
      *G06F 16/23*           (2019.01)
(52) U.S. Cl.
      CPC ......... *G05B 19/0426* (2013.01); *G06F 16/23* (2019.01); *G05B 2219/23399* (2013.01)
(58) Field of Classification Search
      CPC ...... G05B 19/0426; G05B 2219/23399; G06F 16/23; G06F 3/065; G06F 16/27; G06F 16/273

(Continued)

(56) References Cited

U.S. PATENT DOCUMENTS 7,890,508 B2    2/2011  Gerber et al.
9,317,547 B1 *  4/2016  Bachu ..................... G06F 16/22
                        (Continued)

FOREIGN PATENT DOCUMENTS

JP      2009505281 A      2/2009
JP      2016177788 A      10/2016
JP      2019515377 A      6/2019

OTHER PUBLICATIONS

Google Search, define structural non redundancy, 2025, 3 pages (Year: 2025).*

(Continued)

*Primary Examiner* — Phong H Nguyen
(74) *Attorney, Agent, or Firm* — MARSHALL, GERSTEIN & BORUN LLP

(57) ABSTRACT

A method for integration and coordination of measurement and/or control systems by means of a system that is based on a functional data structure, wherein the measurement and/or control systems to be integrated each generate or process data values for the data structure and can generate and modify data structure elements. The method comprises generating a functional data structure with variables for mapping the data values of the measurement and/or control systems; describing the content of the variables by means of a set of defining attributes, wherein at least one attribute can contain variable references to other variables, in order to map networks of variables; creating a primary clone of a variable in the event that at least one of its defining variable attribute characteristics was changed by one of the integrated measurement and/or control systems; and creating machine clones of those variables that lie on dependent variable network paths of the primary cloned variables.

15 Claims, 12 Drawing Sheets

(58) Field of Classification Search
USPC ................ 707/610, 634, 640, 649, 674, 756
See application file for complete search history.

(56) References Cited

U.S. PATENT DOCUMENTS

| | | | |
|---|---|---|---|
| 2007/0043749 A1* | 2/2007 | Gerber ................ | G06F 16/2343 |
| | | | 707/E17.007 |
| 2010/0088289 A1* | 4/2010 | Zhu ......................... | G06F 16/27 |
| | | | 707/E17.014 |
| 2020/0177386 A1* | 6/2020 | Mahmood ............. | H04L 63/102 |
| 2020/0195321 A1* | 6/2020 | Black ................... | H04B 7/0408 |

OTHER PUBLICATIONS

Notice of Reasons for Rejection received in Japanese Application No. 2022-555663, mailed on Feb. 4, 2025, 8 pages.
International Search Report in corresponding International Application No. PCT/EP2021/059296, mailed Jun. 16, 2021, 5 pages.
Perfecto Mariño, et al., "Development of Condition Monitoring Instrumentation for Sensing Power Transformers", 1st International Conference on Sensing Technology, Nov. 21-23, 2005 Palmerston North, New Zealand, 5 pages.

* cited by examiner

METHOD FOR INTEGRATION AND COORDINATION OF MEASUREMENT AND/OR CONTROL SYSTEMS

CROSS REFERENCE TO RELATED APPLICATIONS

This application is a U.S. National Stage Application of International Application No. PCT/EP2021/059296, filed on Apr. 9, 2021, and claims priority under 35 U.S.C. § 119 to European Application No. EP20170082.0, filed on Apr. 17, 2020, the contents of which are incorporated by reference herein in to their entirety.

FIELD OF THE INVENTION

The invention relates to a method for integration and coordination of measurement and/or control systems by means of a system based on a functional data structure, wherein the measurement and/or control systems to be integrated can each generate or process data values for the data structure, and can create and modify data structure elements.

BACKGROUND OF THE INVENTION

Control systems essentially process actual and target or planned values, whereby in more complex use cases this is regularly done in a condensing-interpreting manner over several processing levels ("layers"): Starting with raw data on the smallest possible scale ("atomic information"), the data is aggregated across several processing layers for different purposes from different perspectives (and possibly different delivery systems). In the context of data warehouse systems, such processes are also referred to as "ETL pro- cesses" (extract, transform, load), for example.

The aggregation steps can facilitate the understanding and use of the input information. However, without the possi- bility of reconstructing their pre-processing ("data lineage analysis"), aggregations can also lead to misinterpretations and information losses, even to the point of hindering production processes.

In general, system integrations can be distinguished by the integration interface type (synchronous/asynchronous)
    integration direction (horizontal/vertical)
    integration content (logical/structural or physical/on a
      value basis) and
    integration scope (complete/incomplete).

Horizontal control integration means that control infor- mation is combined on a comparable scale. Vertical control integration requires the corresponding availability of a com- prehensive data lineage across vertical layers (ideally down to the basic data), including the processing steps involved. Vertical control integration is therefore driven by basic data and is essentially a complexity problem.

A commercially available solution example with a logical focus for typical business intelligence data warehouse envi- ronments is known, for example, from DE 10 2016 05 519 A1. Even in this case of data processing that is largely standardized in the ETL context, logical-vertical integration with a strong layer orientation represents a major challenge.

The degree of difficulty, by comparison, increases con- siderably when data processing systems that are not very standardized overall are to be integrated without loss, both structurally and in terms of value (i.e., in addition to an understanding of the (logical) information structures and processing rules, the processed (physical) contents are also to be comprehensible). Empirically given requirements are at best in exceptional cases satisfied with a simple, layer- by-layer hierarchical processing, in industrial practice more flexible network structures are regularly required.

Commercially available integration solutions (e.g., SAP in the enterprise resource planning including production planning and control environments) deal with this challenge mainly by specifying standard processes that can be cus- tomized by users only to a limited extent. In practice, there are both technical and economic limits to this system- specific standardization, which is why the process-related gaps in demand there are usually still filled with individual solutions ("individual data processing systems", abbreviated IDV).

Accordingly, these IDV-solutions are little to not inte- grated and thus usually represent the most challenging use case for further, comprehensive integration.

SUMMARY OF THE INVENTION

One aim of the invention is a complete, synchronous and both logical and physical integration of distributed measure- ment and/or control systems. With this method, even the most complex integration problems can be manageable without having to accept significant losses of information.

This problem is solved by a method according to the features of claim 1. Beneficial embodiments of the method are the subject of the dependent claims.

A lossless, vertical integration with complete controlla- bility of processing procedures and capability to connect to heterogeneous interfaces requires a suitable functional data structure design. According to the invention, a functional data structure is therefore defined for mapping variables in order to process data of the measurement and/or control systems. The data values, also referred to as measurement values, can be, for example, actual and target values, planned values, forecasts, estimates, etc.

According to the invention, the possibility of a complex- ity-reduced controllability of the arbitrarily increasing com- plexity potential in the dynamic integration case results from an initially seemingly counterintuitive acceptance of a pro- cess- or system-immanent complexity increase with respect to the functional data structure. Essential problems of the potentially extreme coordinative complexity of the control of distributed systems are solved by simple, non-lossy method steps.

The measurement and/or control systems integrated via the described method can thereby create not only the data contents, but also their structures during operation (thus enabling e.g. parameter optimizations in concrete processing runs via structures that can be optimized in real time), with potentially complete control over all change and processing events for all interfaces involved. This goal is achieved, among other things, by dispensing with update processes with respect to the defining portions of the functional data structure. The invention thus realizes a procedural complex- ity reduction by a controllable, structural complexity increase.

Due to its specific functional data structure design deci- sions, this method also allows for organization-independent use; the method is "arbitrarily" connectable due to the fundamentally base-data-driven approach.

The essential element of the data structure are variables, which have a set of attributes. These attributes are also referred to as "variable attributes" in the following. In terms of content, the variables are identified by means of a set of defining attributes. At least one of the defining variable attributes contains variable references and insofar indicates from which variables of the variable population in the system the respective variable depends (including self-reference, for example to support c.p. period distinctions). The variable attribute value characteristics are to be distinguished from the variable characteristics or variable values assigned to the variables, which represent the data values of the measurement and/or control systems.

With the data structure described in more detail below, the variables and data values of the measurement and/or control systems can be modeled as networks of variables (for example in the form of a directed, acyclic graph in a calculation context), whose nodes are formed by the individual variables and whose edges result from the variable references. A set of insofar connected edges is called "path" or "network path" in the following.

In this basic form, any measurement and/or control systems can be integrated procedurally independent of local conventions.

The attribute with variable references contains in the simplest case only associative assignments of other variables to the considered variable. Usually, however, an attribute with variable references contains more detailed information about the determination or calculation rule of the data value of the considered variable, for example, functions which depend on one or more variables.

Measurement and/or control systems have access to the functional data structure as interface systems with the possibility to create new variables as well. System interfaces are defined as a set of variables. To enable loss-free and interference-free integration and coordination between the interface systems, a coordinated cloning process of the network paths dependent on one or more interface elements which are subject to a defining change is usually triggered. A defining change is a change of at least one of the defining variable attribute characteristics of one or more variables.

This process (and synonymously a variable set affected by a defining change) is called "edition" in the following. With the completion of the edition, clones of the changed and dependent variables (i.e. the dependent paths in the variable network) are usually created.

The clones of the variables definingly changed by the measurement and/or control interface systems are called primary clones here. In addition to these primary clones, variables which contain the originals of the primary clones in their variable reference (referred to below as "predecessors") are also cloned in a coordinated manner. The clone predecessor variable is replaced in the variable reference by the clone.

The clones generated in this way, which depend directly or indirectly on the primary clones, are subsequently referred to as secondary or machine clones; the generation of secondary clones can trigger cloning operations of further variables, which in turn refer to the predecessors of the machine clones, and so on, until no further dependency relationships are found or a network node explicitly interpreted as final has been reached:

The last clones on these network paths (and their predecessors) shall be called "final variables".

Variables without variable reference contents are referred to here as "atomic variables". In the context of directed variable networks the extreme nodes of a path can also be interpreted as "final input variables" or "atomic output variables".

In the cloning process, all attributes of the variable that have not been changed by the interface system are copied, the attributes affected by the change are taken over in an appropriately modified way, and it is beneficial to add non-defining context information.

Variables are thus identified by defining attributes (whose changes in value by interface systems lead to the cloning processes described above). Also, the variables can be described by non-defining attributes.

Examples of defining attributes are contextual attributes, such as those used to identify assigned processes, resources, or organizational structure units measurement characteristics such as quantity, time, costs or qualitative aspects the measurement perspective of measurement or data values (e.g. as-is/target/plan/forecast)

period category (e.g. year, month, week, day, hour, timestamp) and period characteristics, as well as the already above mentioned variable references.

Examples of non-defining attributes, which do not trigger structural changes of the system by cloning processes in case of value changes, but which are relevant for the method, are categorizations of defining contexts and measurements comments attributes for authorization control attributes to indicate the clone trigger event type (primary/machine)

attributes for holding predecessor references (in the clone context)

attributes to mark CRUD (create, read, update, delete) events, e.g., event type, user, timestamps, clone sequence identifier features, etc.

Preferably, all or at least some of the variables generated in a cloning process are provided with a unique clone number, which is stored, for example, in a suitable attribute of the variable. This measure allows the history of the clones to be documented. It is particularly preferred if all variables generated during a single cloning process are provided with identical clone numbers. This ensures that it can be clearly determined in retrospect which clones were created by common edition events.

It is also particularly beneficial if a variable clone is also stored with corresponding information containing a unique reference to the original variable, so that an assignment of the clone to the cloned predecessor variable is always possible. This reference is stored, for example, by means of the previously mentioned attribute for recording the predecessor reference.

It is also beneficial if it is stored for the variable clones whether it is a primary clone (i.e. the primary clone was generated by access of the measurement and/or control system) or a machine clone. The latter is generated automatically during the cloning process, due to the direct or indirect dependency on variables that have been changed in a defining way and thus have triggered the cloning process.

In this context, a wide range of additional information about the variable can be stored in order to further optimize the traceability of the cloning process and thus of the entire data structure. Additional information, which is stored in suitable attributes of the variable, can include a more detailed description of the specific cloning process and one or more events that triggered the cloning process and/or the triggering interface systems or users. Suitable timestamps are also beneficial to ensure a chronological classification of the cloning process and the related clones.

For the interface access of an individual measurement and/or control system to the data structure, different access variants can be differentiated. A first variant is characterized by a value-changing or value-assigning access, by which changes or assignments of the data value of at least one variable or its attribute values are prompted.

Changing the data value of a variable can have effects on the data values/measured values of a large number of dependent variables due to the net-like data structure.

The change of (in particular defining) attribute values can also prompt structural changes as a result of the cloning processes triggered by this, which is a second access variant for the interface systems.

In addition to the structure design by generation of variables as essential structural elements, the invention also enables structure-changing accesses of interface systems to the data structure, whereby not only data value changes of individual variables can take place, but also in particular the variables' structural connection can be designed.

In the case of a purely data value changing variable access, only the data values of the variables interpreted as functionally related are determined. For performance reasons, it makes sense in this case if value calculations/value assignments for a data value of a variable are not started until all value determinations/value assignments of its referenced variables have already been completed.

It is possible to limit the interface access for a measurement and/or control system to a limited scope of the data structure. Here the definition of a logical partial structure is conceivable, for example by the specification of a set of variables visible for the interface system, here referred to as edition like above, or in the following referred to as "segment" in the context of variable value determinations.

It is also possible to interpret variables that are non-final from a physical perspective as final variables for or by interface systems: cloning and value determination processes then end with these variables, even if further variables actually exist in the network that reference them.

In addition or alternatively, from a physical point of view, non-atomic variables can also be interpreted logically as atomic variables, i.e. their variable references are ignored from a logical perspective.

This allows the definition of logical substructures of the functional data structure, which is otherwise complete from a physical perspective. A value-assigning or structure-changing access, which can cover an extended set of variables by the functional connection, can be limited in such a way to logical substructures; it is on the other hand also conceivable that such accesses have also changing effects on the physical data structure.

Within the scope of the method, data structures and data values can be historized and protocol or logging data can be generated for the technical method itself. According to an optional embodiment of the method, it is possible to visualize at least part, preferably all, of the data structures and data values, such as variable network structures, variable values and value changes, which also enables graphically intuitive pattern, scenario and driver or sensitivity analyses, and facilitates both system administration and guidance for interface systems.

The use of the method results in a quasi-automatic inventory of the application fields with comprehensive data lineage analysis capabilities (both in terms of structures and processing rules as well as processing results).

The method can also be used to automate reverse engineering processes (in combination with appropriate parsers for source codes in otherwise poorly or undocumented areas) by using the functional data structure to visualize (possibly automatically determined) processing operations.

In addition to the method according to the invention, the present invention also relates to a system consisting of several, usually distributed measurement and/or control systems and a central or distributed unit (integrative control system) for managing the functional data structure.

The integrative control system has a processing logic which, when called, executes the steps of the method according to the invention. Accordingly, the system is characterized by the same advantages and properties as have already been shown above on the basis of the method according to the invention. For this reason, a repetitive description is omitted.

The method described here also enables a machine-supported, simplified system initialization, for example by a modified copy of prototypical networks or a corresponding use of the system-immanent cloning logic (initial creation of prototypical networks, which are cloned analogously after modification), or by a system-inherent migration procedure, in which an interface system data structure is mapped to the method.

The structures and values available in the system can in turn be exported (in some cases also executable, e.g. in the case of spreadsheet systems) into standard formats of the interface system in order to support local asynchronous editing processes.

The invention also comprises a computer program, the execution of which by a computer carries out the method according to the invention.

BRIEF DESCRIPTION OF THE DRAWINGS

Further benefits and features of the invention will be explained in more detail below with reference to an exemplary embodiment illustrated in the drawings.

They show.

DETAILED DESCRIPTION

Figure 1:
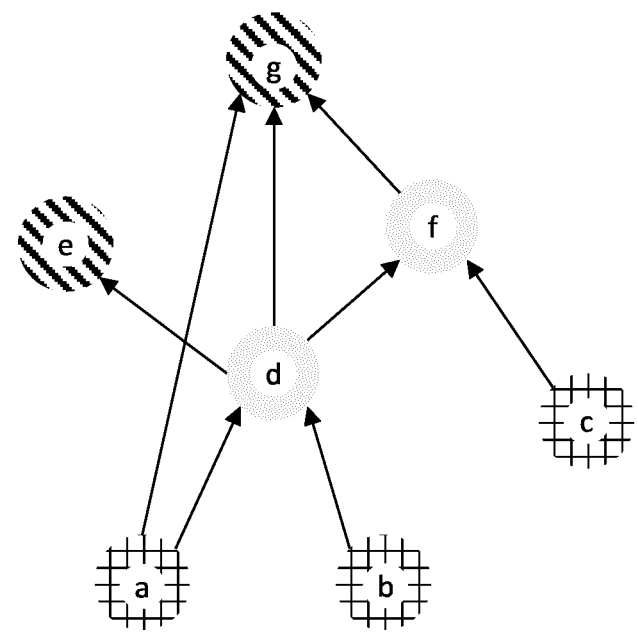
FIG. 1: A simplified graphical representation of a directed acyclic graph as a special implementation example of a data structure.

The core idea of the method as well as possible applications are to be shown again in detail in the following. The new method enables a complete, synchronous and both logical and physical integration of measurement and/or control systems, by means of which even highly complex integration and coordination problems remain technically controllable and not only value-content but also structure-design optimization problem solutions are made possible: The potentially extreme coordinative complexity of controlling distributed systems is considerably simplified here by simple procedural steps without loss of information. The measurement and/or control systems integrated via the system described can, with optimized performance, also structurally change their contents during operation, enabling e.g. parameter optimizations in concrete processing runs via structures that can be flexibly designed in real time, with potentially complete control over all change and processing events for all interface systems involved.

In this respect, the system offers an essential basis for the implementation of autonomous control solutions for a wide range of technical fields of application. The design decisions described below with regard to a functional data structure as well as the method steps and overarching system aspects represent the essential basis of the invention.

Lossless vertical integration is driven by basic data; therefore, complete traceability of processing procedures with connectivity to heterogeneous interfaces requires an appropriate functional data structure design.

The fundamental, atomic element here is a variable, which is identified in terms of content by a set of defining attributes. Such sets of defining attributes comprise exemplary:

one or more context characteristics (e.g., assigned organizational structural unit, process, etc.), measurand, measurement perspective (e.g. actual/target/plan/forecast/ . . . ), period category (e.g. year, month, week, day, hour, timestamp), period characteristic, variable references (functions of other variables, e.g. mathematical functions (e.g. deterministic, stochastic) or simple mappings, etc.)

Likewise, the variables can also have non-defining attributes, such as for categorizing contexts and metrics, for commenting, for authorization control, to identify the clone trigger event type (primary/machine)

to include a reference to the variable's predecessor (in the case of clone events), for the identification of CRUD events (create, read, update, delete), e.g. event types, users, timestamps, clone sequence identifier features, etc.

To distinguish the values/characteristics of the variables (i.e., the measured value to the attribute measurand, where "measurement" is generally interpreted as an assignment of a value to a variable; the measurands, for their part, can be qualitative or quantitative) from the values/characteristics of the variable attributes In the following "variable values" are distinguished from "attribute values" for better orientation.

In order to be able to map even highly complex interface systems, many-to-many relationships between variables are made possible, i.e. networks of variables. This also ensures the representability of arbitrary organization models: An organizational model describes the arrangement of system components as organizational units as well as their processes. Networks represent the most general form of a structural organization model, as whose more special characteristics other organization structures can be interpreted (e.g. hierarchical arrangement relations). The basic data structure thus also allows, for example, a flexible distribution between centralization and decentralization of production processes and their control.

In this respect, the variables correspond to the nodes of variable networks. The edges can be identified at least by the nodes' variable references. Depending on the application, the coordination and control of relevant network changes is done via the variable design, by which the containing "physical" network can be identified. Subsets of physical networks are to be called "logical" networks here.

The variables determine the structure of the mapped system. The variables as individual structural elements can be assigned any number of values (variable values); the value assignments can be further specified, e.g. by "attachments".

In the special example case of an integration of distributed systems with a calculation focus, these are treated as directed acyclic graphs: In this basic form, distributed calculation models can be integrated, shared, cloned, or generally changed in content across the board, independent of local specifics. The associated high technical complexity can be controlled by an appropriate choice of attribute characteristics for the variables, allowing complete control of all changes.

A variable behaves as an input variable in the calculation case with respect to another variable if the other variable references the variable.

In particular, a distinction is made according to a variable's position in the network between atomic input variables (there are variables dependent on them, but no variables influencing them) and final output variables (they have input variables, but they in turn do not influence any other variables).

FIG. 1 shows an only-illustrative example of a simple directed acyclic graph. The variables a, b and c are atomic input variables, while the variables e and g are final output variables. Value assignments to a variable in the network trigger value assignments with respect to the dependent variables along the dependencies defined in the variable references. These value assignments are identified by a unique sequence value. The assignment runs can be commented and provided with identifying or descriptive attributes.

A scenario in the narrower sense is a set of value assignments of certain variables of a network, which represent atomic input variables from a physical or logical perspective. In addition, a scenario in the broader sense comprises the total set of all value assignments triggered by the scenario in the narrower sense in the paths of the corresponding network that depend on the scenario in the narrower sense.

A system interface is defined as a set of variables through which interface systems communicate with the integrative control system. Interface systems have two basic perspectives regarding the system:

structurally designing (modification of networks by edition of nodes, especially by changing their defining attribute values; besides the process itself also a set of affected nodes is called "edition" here).

Within editions may be distinguished, which variables are to be interpreted logically as final outputs (thus after finalization of an edition in the context of the thereby triggered cloning processes no more into further variables are to flow).

value-changing or value-assigning: Sets of variables whose variable values are to be assigned or determined are referred to here as "segments". Within segments may be distinguishable which variables behave logically as atomic inputs or whether and which variables are to be interpreted logically as final outputs. If no atomic inputs are specified, the physical-atomic inputs to the elements of the segment are determined. If no final outputs are specified, the values of the paths of the network that depend on the atomic inputs are determined as assignment targets.

The set of variables dependent on each other via the variable reference definitions defines a physical net. Segments (as subsets of physical nets) can also be interpreted as logical nets.

Edition and segment are thus logical views of the physical nets given by the variables if all net variables are not completely selected.

The structural and value network perspectives are interdependent in that the interpretation of a non-atomic input variable as an atomic input may implicitly give rise to a structural change event (at least by implicit modification of a variable reference characteristic as a result of a variable value override, with possible edition of further defining attributes of the affected variable).

The identification of a scenario in a broader sense starts either indirectly via the identification of target variables, for which the atomic inputs are found, or via the identification of atomic inputs, if necessary with additional explicit identification of target variables, up to which the value determination is to take place.

Variable value changes or value assignments to atomic input variables lead to a successive variable value determination of the variables' dependent paths up to the final output variables. For performance reasons, the variable value determination of a dependent variable should start when all new values of the dependent variable's input variables have been determined. Apart from that, the sequence of variable value determinations can be further optimized by considering appropriate objective functions.

The variable values that belong together in the context of a scenario determination are identified by an assigned unique sequence value and marked with regard to their context to enable a simplified technical reconstruction of scenario runs.

An illustrative, non-exhaustive example is given in FIGS. 2a to 2e. FIG. 2a takes up again the variable network structure of FIG. 1. Now a scenario is to be determined with respect to the atomic input variables a, b, c with respect to an explicitly given final output variable g. The physical network also includes the final output variable e, which is not considered here because of the logical partial view.

Figure 2A:
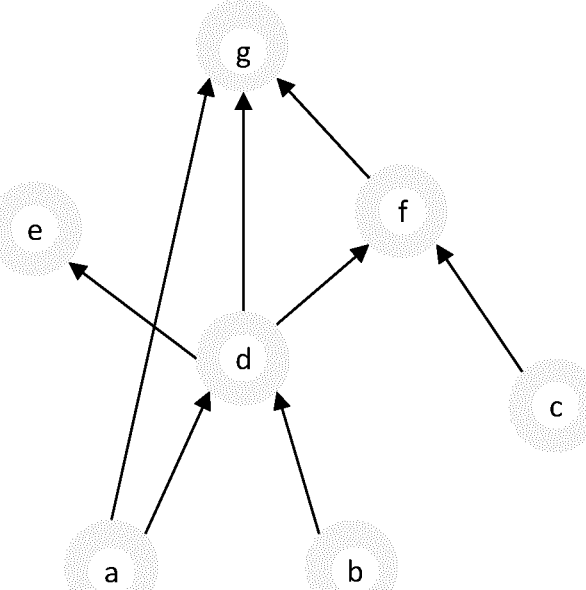
FIGS. 2a-2e: Representations of the graph according to FIG. 1 to illustrate the procedure for a value change or value assignment by an interface system.
Figure 2B:
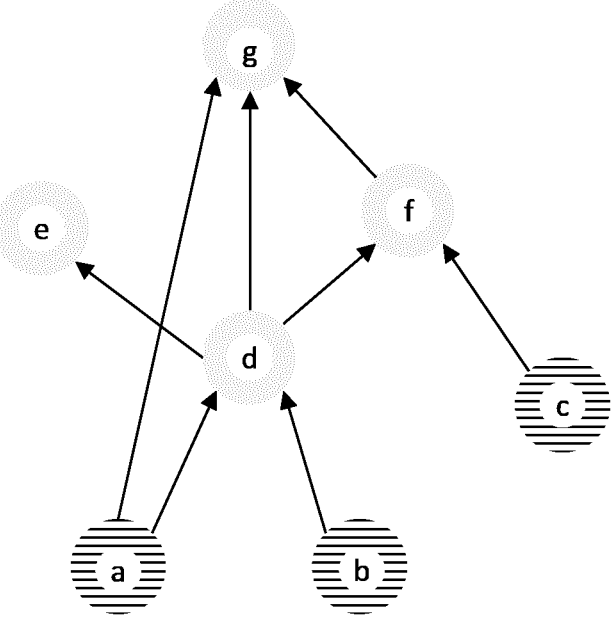

In FIG. 2b, values are now directly assigned to the variables a, b and c. The scenario in a broader sense, which is restricted with respect to the final output variable g, also includes the dependent variables d and f.

Figure 2C:
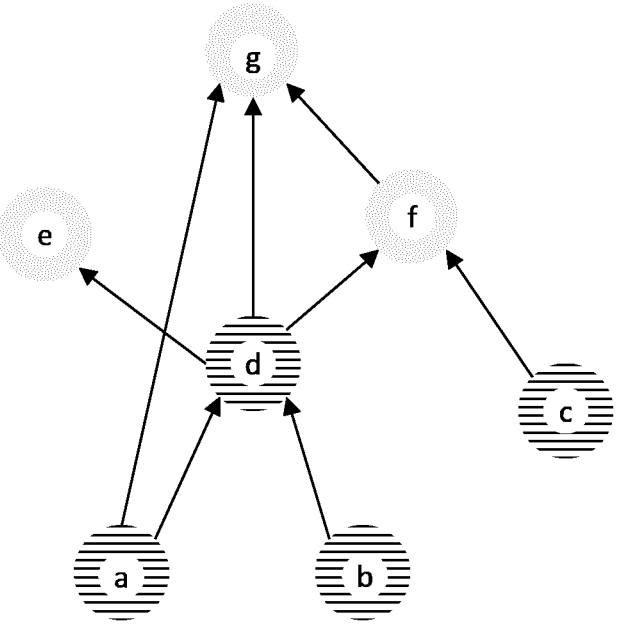

The variable d can be determined first, as indicated in FIG. 2C.

Figure 2D:
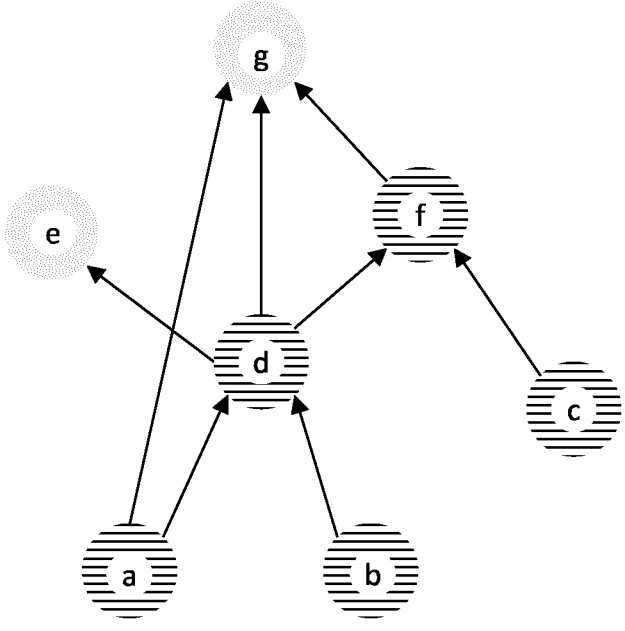

The variable f can only be determined after the value of the variable d has been determined, as indicated in FIG. 2d.

Figure 2E:
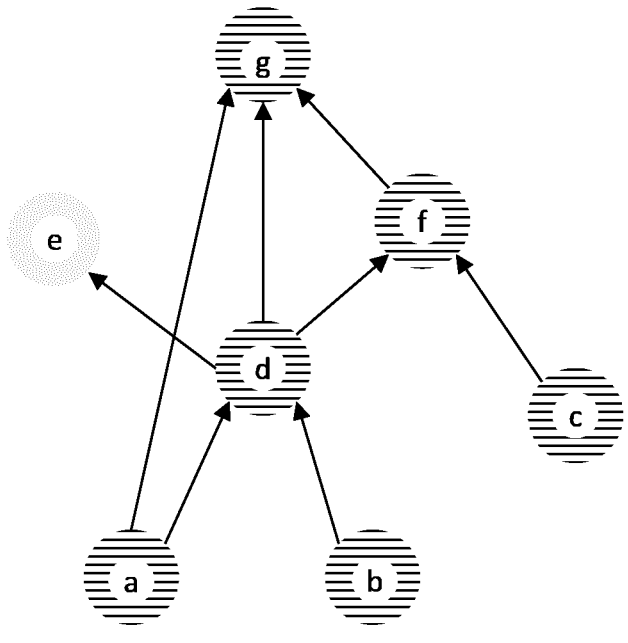

After the new values of the input variables a, d and f required to determine g are available (FIG. 2d), the final output value of g can then be determined in the last step (see FIG. 2e).

A net structure change is triggered by one or more changes of defining variable attribute characteristics of one or more variables. In order to allow easy technical and functional control of the change events and structures, defining variable changes generally lead, all other things being equal, to a cloning of the affected variable set as well as to a coordinated cloning of the affected variable set's dependent paths up to the respective final output variables. The generation of supposedly redundant structural elements is therefore deliberately accepted in order to achieve simplified overarching controllability in a sustainable manner.

Any structural cleanups that may be required can otherwise be carried out rule-based or asynchronously (e.g., by means of consensual deletion flags made by all relevant interface systems in order to avoid uncontrolled information losses).

Variables to be interpreted logically as final outputs can be specified explicitly in order to save resources (the entire dependent paths do not have to be cloned in every case). The variables created during a clone run receive the same clone sequence number and a reference to their predecessors, i.e., their source variable. The clone runs can be additionally specified further.

The variables uniquely define the physical nets containing them ("variable-net-equivalence rule"). However, path cloning processes can result in (supposedly) redundant variables when viewed in isolation. Thus, for the identification of a variable, the defining attribute characteristics of the variable alone are not sufficient, unless the variables are atomic input variables: In principle, the variables' network context should also be taken into account.

The cloned variables may be marked as to whether they were cloned as dependent path elements in purely technical terms, or whether they are the primary (path) clone trigger elements (i.e., the first clones of the definingly changed variables; the primary clone trigger events may be additionally recorded there for performance reasons). Also, overwriting a previously determined value of a variable with an exogenously given value may implicitly correspond to a structural change (e.g., if a non-atomic input variable is cloned to atomic input), which may trigger a clone of the dependent paths analogous to the logic described.

So far as not every interface system always requires or may possess complete transparency, the role/rights concept can be implemented at the data record level (both structurally and in terms of value). Cloning processes are basically independent of the authorization concept: A role that is authorized to create certain primary clones can also trigger the creation of variables for which the role is not itself authorized; existing predecessor rights are also cloned. Exceptions to this rule are configurable.

Figure 3:
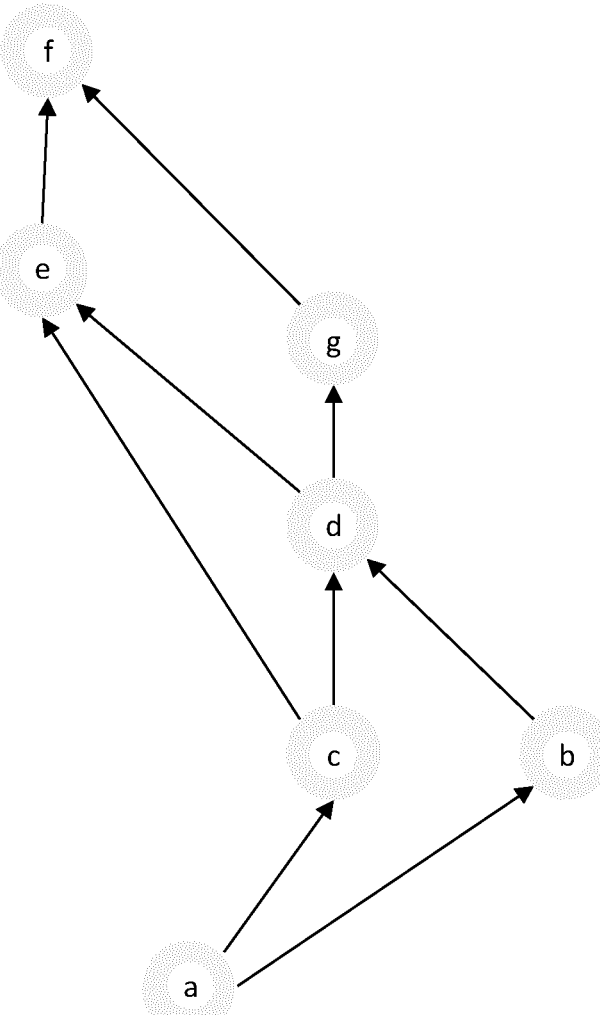
FIG. 3: Another simple, exemplary representation of a variable network as an implementation of a functional data structure.

An illustrative, non-exhaustive example is shown in FIGS. 3, 3a and 3b, which again visualize a variable network as a directed, acyclic graph. The network here consists of the variable elements a through f, with a as the atomic input and f as the final output variable.

Figure 3A:
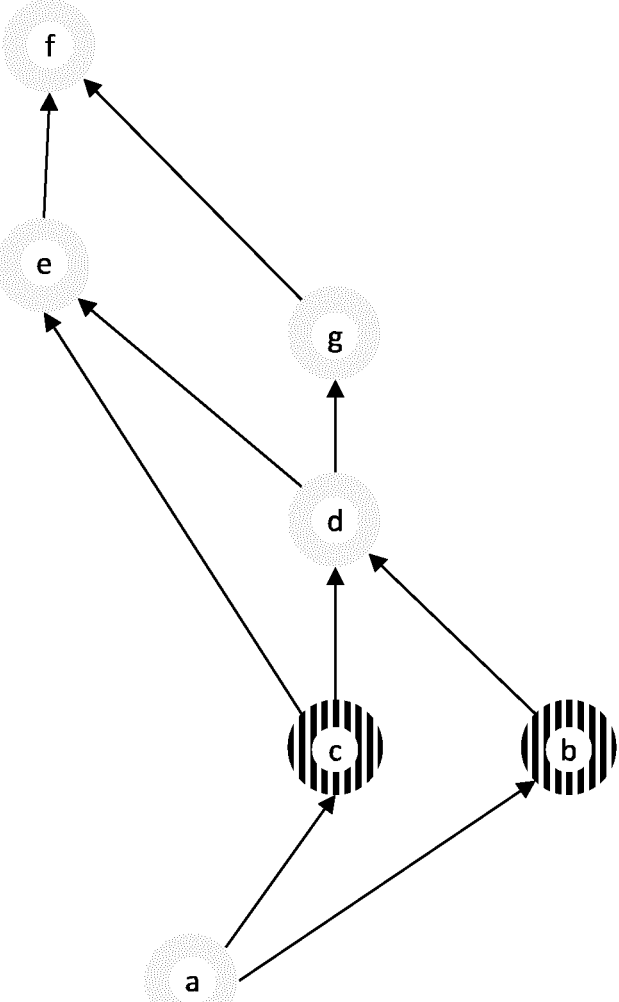
FIGS. 3a, 3b: The variable network according to FIG. 2 for describing the cloning process according to the invention, in the example case with two defining variable changes.
Figure 3B:
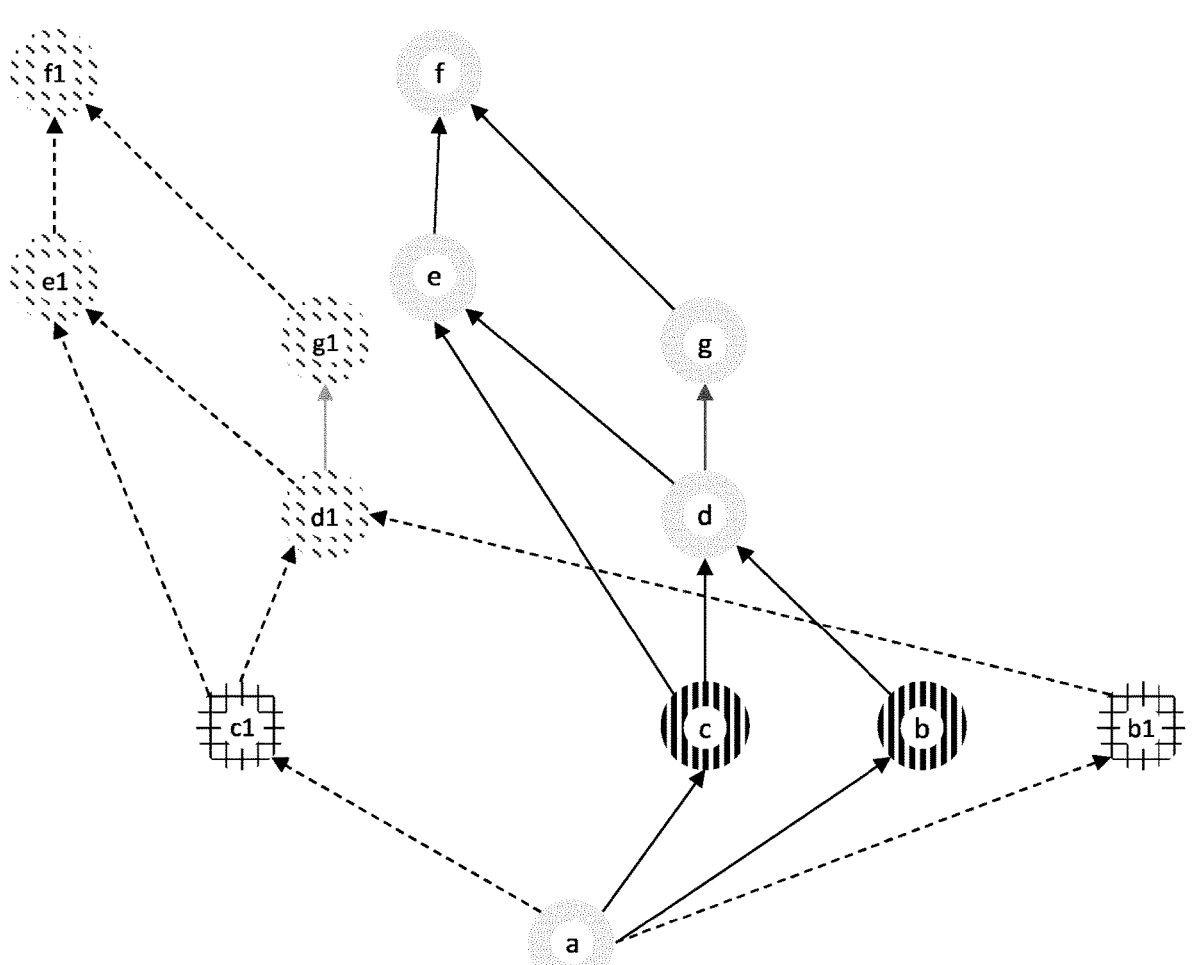

In the first step, according to FIG. 3a, the variables b and c were changed by an interface system with respect to one or more defining attribute values (for simplified visualization here without removing or adding network elements or changing the dependency structure), which leads to the triggering of a cloning process. Thus, the cloning process here has two common triggering events.

The defining variable attribute changes lead to the cloning of the affected variables c and b. The resulting primary clones are denoted here as c1 and b1. The cloning process also generates machine clones of the dependent variables d, g, e up to the final output variable f, which are denoted here as d1, g1, e1 and f1. Accordingly, the original network remains intact, it is only extended by the cloned new elements b1, c1, d1, e1 and f1.

Depending on the number of changes, their type and positioning in the network, the network structures can grow exponentially. However, the associated increase in complexity remains technically controllable through the following design elements:

technical/subject-specific binding by means of a unique technical identification characteristic of the clone run discriminability of machine (here: d1, e1, g1, f1) and primary clones (here: c1, b1)

specification of further information about the clone run (e.g. changing system, timestamp, context, triggering events (which variables were changed with respect to which defining attribute values and to what extent, etc.))

c.p. network context of the variables.

The functional data structure described above in combination with the basic procedural steps of the system implemented on this basis enables comprehensive and loss-free integration of and coordination between interface systems, especially with a measurement and/or control focus, with high flexibility requirements. As an additional benefit, the method promotes structural non-redundancy by avoiding non-integrated archives. It is easy to understand that the systems integrated by means of this method can not only optimize parameters in terms of value for given control basics, but can also dynamically adapt their structures at runtime with minimized collision risks (e.g., due to update anomalies), with potentially complete control over all elements and value assignments for the interface systems involved.

In addition to comprehensive consistency checks and performance optimization, this allows in particular dynamic measurement and/or control process optimization of higher order, up to autonomously optimizing control systems, especially when using interface systems based on artificial intelligence. System implementations based on the method can themselves serve as the basis for implementing an artificially intelligent integration and control system.

This core benefit is illustrated below using a highly simplified, non-representative example shown in FIGS. 4a and 4b.

Figure 4A:
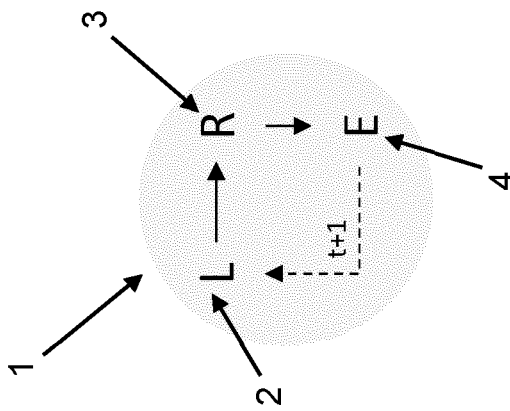
FIGS. 4a, 4b: Different exemplary representations illustrating the measurement and control of a production process.
Figure 4A:
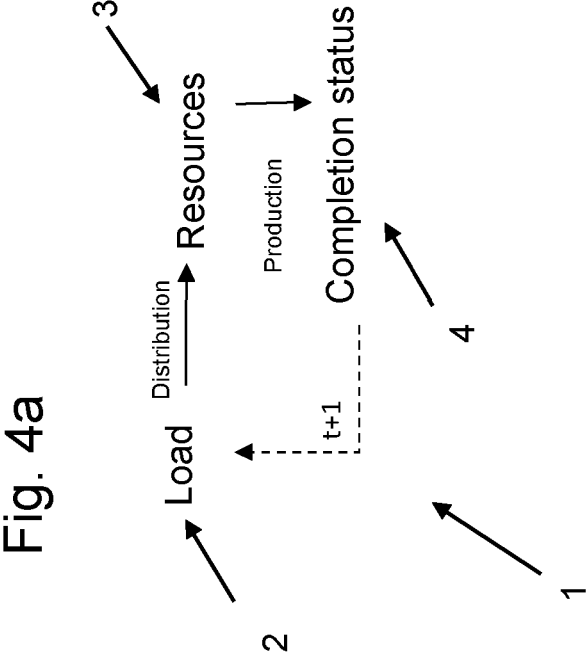

Let the production process 1 shown in FIG. 4a be given, in which in a period t workload 2 is distributed to production resources 3, which complete the work in whole or in part. The result of a process execution is the completion status 4 of the production; any parts of the workload 2 that are not completed are included in the load quantity in the next production period t+1.

Figure 4B:
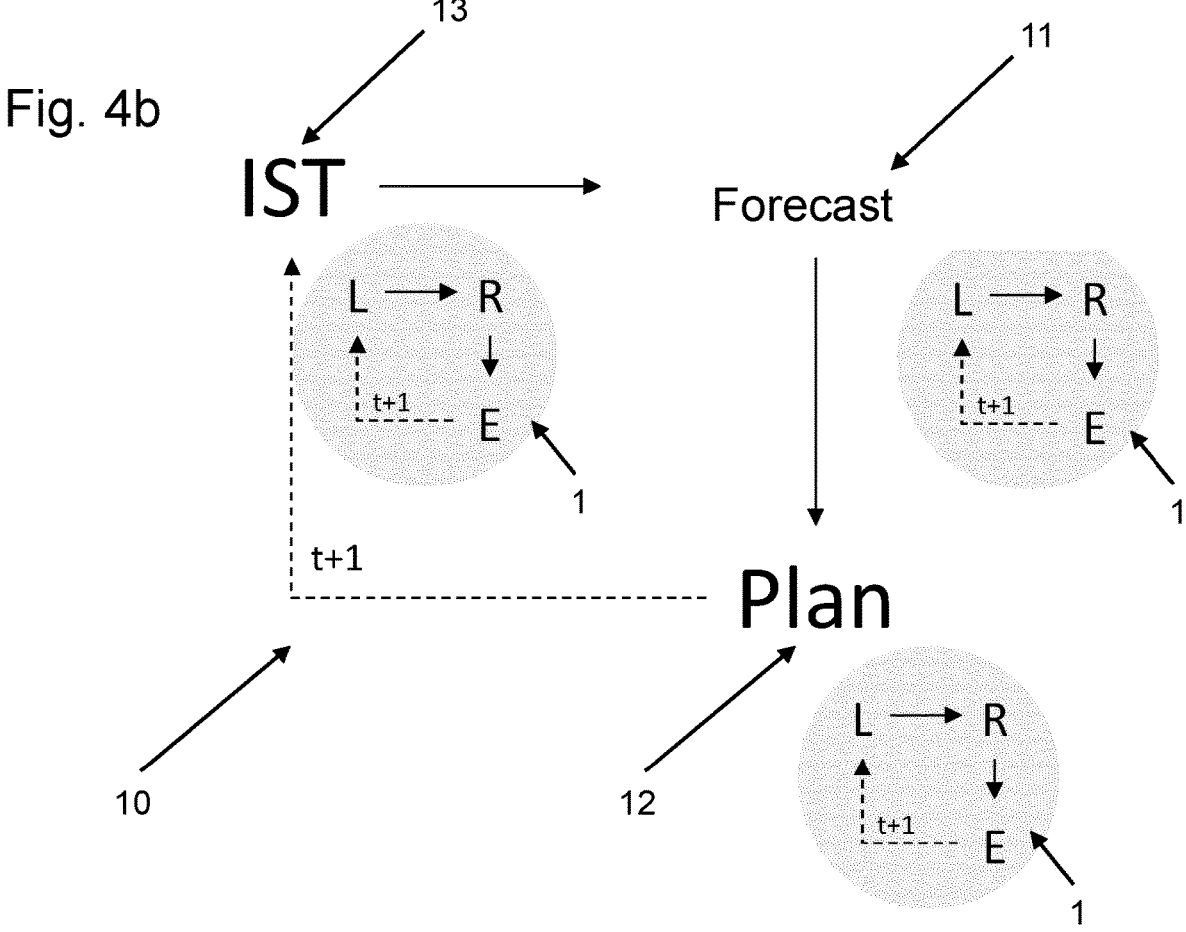

A corresponding control system 10 for the production process 1 can typically be described according to the control loop shown in FIG. 4b.

The measurement variables for mapping the circumstances of workload, resource input, production and completion can be given in different perspectives as actual values 13, forecast values 11 and target or planned values 12. In particular, planning decisions in the production process can be based on forecasts or made arbitrarily. The forecast or planning quality can be measured by deviations of the forecast/plan or target value 11, 12 from the actual value 13 (both qualitatively and quantitatively) and can cause forecast or plan adjustments.

Figure 5:
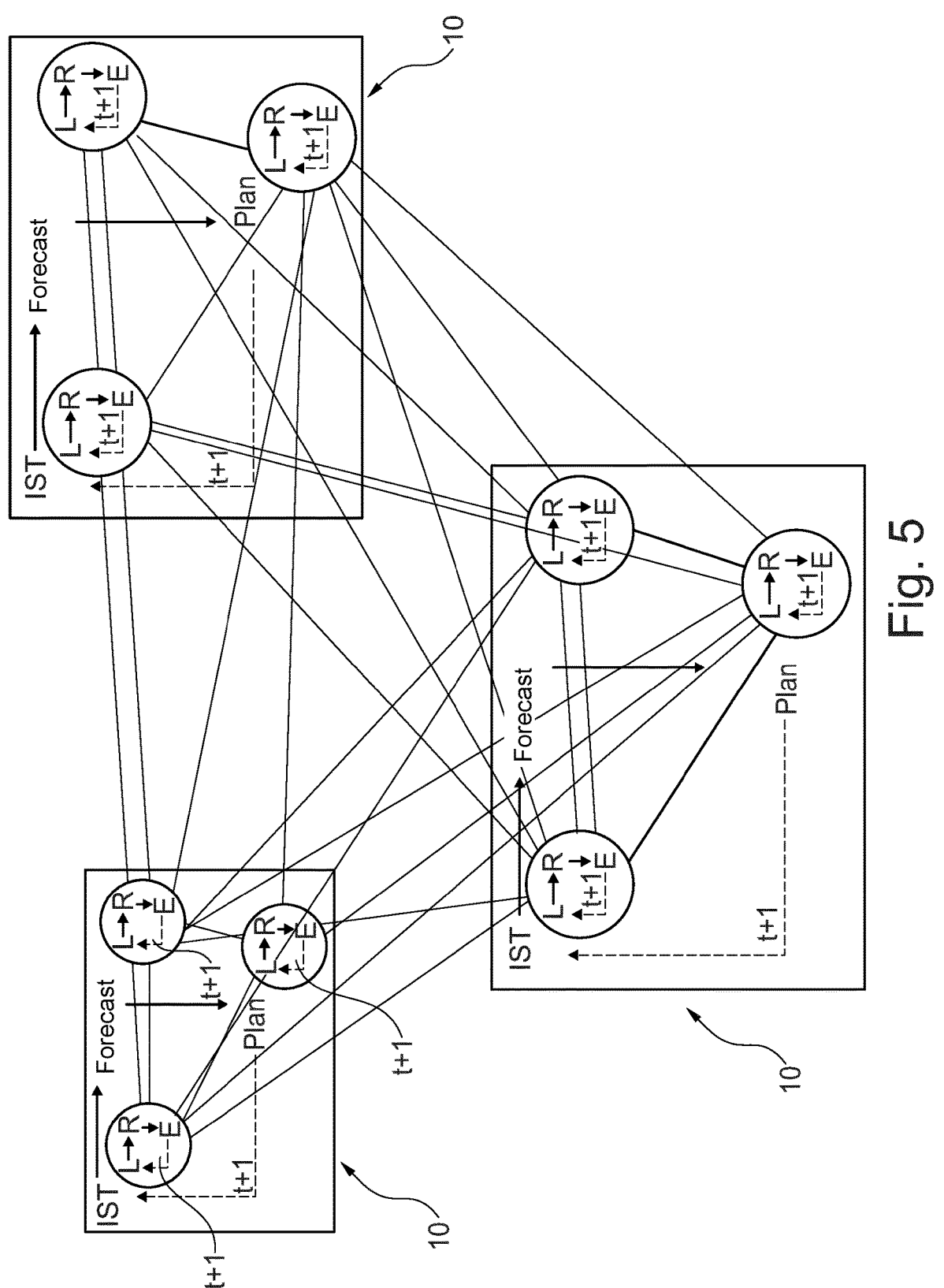
FIG. 5: A summary illustration of an integration and coordination scenario between multiple interface systems.

In the context of interdependent-distributed production processes 1 with correspondingly distributed production control systems 10, as shown in FIG. 5, the described method enables lossless integration, coordination and overall parameter optimizations, as well as parallel structural adaptations of the mapped aspects coordinated globally in real time with arbitrary design, i.e. "higher-order optimizations".

After integration, the interface system boundaries can also be freely selected, i.e. previously isolated subsystems can be easily networked down to the atomic data level, thus achiev-ing fundamental organizational structure independence (e.g. vertical integration as free distribution between centralization and decentralization).

The possibility of real-time consolidation of the mapping of all interdependencies in the integrated system enables optimization across interface systems with free choice of target variables, which can be considered a necessary condition for the realization of intelligent systems.

Benefits of the Method

The benefits of the method are basically application-dependent, so the following is a general overview of beneficial aspects without claiming to be exhaustive.

General Benefits:

Performance optimization

Risk minimization

Cost/resource/process/system efficiency

Reaction and lead time improvement

Increase in information content

Data quality improvement

Function/performance scope enhancement (e.g., increasing degrees of freedom of dedicated process functions)

Specific Benefits:

Comprehensive standardization of (local or distributed) data structures without significant restrictions in terms of content or processing Comprehensive integration of distributed ERP systems Bidirectional functional integration of interface systems (e.g. database connection to spreadsheet calculations, etc., possible partial use of interface system formats as system frontend)

Enabling extended overarching and even fully machine-based analyses

Optimization of content processes in data analytics

Replacement of locally non-transparent control and processing procedures by overarching transparent, audit-proof procedures Complexity reduction without relevant information loss while maintaining arbitrary adaptability (also ad hoc) and complete control Flexible, collision-free adjustments in all relevant aspects (e.g. model generation and model changes, overwriting of calculated values, . . . )

Improved consistency by promoting non-redundancy with regard to variables (additional benefit: less storage space required) and by implicit data and process quality assurance End-to-end process integration; enabling cross-process quality assurance Implicit, automatic inventory of the mapped processes (e.g. data lineage analysis)

Simplified reconstruction/reverse engineering at arbitrary entry points

Extended visualization options (processing structures, value flows, . . . )

Process cost reduction (regarding system and content maintenance, analyses, reconstruction, . . . )

Improved ability to react, shorter lead times

Improvement of audit proofing and compliance

Enabling true vertical control integration instead of lossy, interpretive control processes Simplified preparation and execution of standard ERP migrations through implicit, "automatic" reverse engineering of formerly distributed IDV systems.

The invention claimed is:

1. A computerized method for integration and coordination of measurement and/or control systems by means of a system based on a functional data structure, wherein the measurement and/or control systems to be integrated can each generate or process data values for the data structure and can generate and modify data structure elements, comprising the steps of:

a. generating, with a computer, a functional data structure with variables for mapping the data values of the measurement and/or control systems, b. describing, with the computer, content of the variables by means of a set of defining attributes, wherein at least one attribute contains variable references to other variables in order to map variable networks, c. creating, with the computer, each time when at least one defining variable attribute value of at least one variable has been changed by at least one of the measurement and/or control systems, a primary clone of said at least one variable, d. creating, with the computer, machine clones of the variables that lie on dependent variable network paths of the primary cloned variable, wherein the primary cloned variable, together with the machine clones of the variables that lie on the dependent variable network paths, define a non-redundant data structure.

2. The method according to claim 1, wherein the variable references to other variables is defined by functional or associative mapping relationships.

3. The method according to claim 1, wherein the created clones include attributes, and further comprising storing a unique cloning operation sequence number in in an attribute of each created clone, and storing a reference to their associated original variable in an attribute of each created clone.

4. The method according to claim 1, further comprising storing, in an attribute of one of the created clones, whether the created clone is a primary clone or a machine clone.

5. The method according to claim 1, further comprising assigning, to the created clones, further information about the cloning process via one or more further attributes, including information about one or more events triggering the cloning process and/or about users triggering the cloning process and/or timestamps of the cloning process.

6. The method according to claim 1, wherein the one or more measurement and/or control systems have access to the functional data structure and the functional data structure's data values via system interfaces, and further comprising distinguishing between accesses which change data values or assign data values and accesses which generate structures or change structures.

7. The method according to claim 6, wherein the system interface of a measurement and/or control system is defined as a proper or an improper subset in relation to the variable population of the functional data structure.

8. The method according to claim 6, further comprising limiting the access to subsets of the data structure and its data values by specifying variables, the change of which does not adjust any variables dependent on them, or only data values for parts of the data structure to be determined.

9. The method according to claim 6, wherein in the case of data value changes or data value assignments and data value determinations of variables, further comprising assigning a unique sequence value to the variable data value for storage in an attribute.

10. The method according to claim 1, further comprising providing variables and their data values with explicit delete requests for coordinated deletion by interface systems.

11. The method according to claim 1, further comprising providing permissions that are effective down to individual variable level and the data values.

12. The method according to claim 1, further comprising historizing data structures and data values and generating protocol or logging data for the method.

13. A system comprising a processor coupled to a memory with measurement and/or control systems as interface systems and with a program memory with control commands stored therein, upon execution of which cause the processor to:

a. generate, with a computer, a functional data structure with variables for mapping the data values of the measurement and/or control systems;

b. describe, with the computer, content of the variables by means of a set of defining attributes, wherein at least one attribute contains variable references to other variables in order to map variable networks;

c. create, with the computer, each time when at least one defining variable attribute value of at least one variable has been changed by at least one of the measurement and/or control systems, a primary clone of said at least one variable; and d. create, with the computer, machine clones of the variables that lie on dependent variable network paths of the primary cloned variable, wherein the primary cloned variable, together with the machine clones of the variables that lie on the dependent variable network paths, define a non-redundant data structure.

14. The system according to claim 13, wherein the control commands further include commands which, upon execution, allow individual steps of the system to be visualized.

15. A non-transitory computer program product including instructions stored therein which, when the instructions are executed by a computer, cause the computer to;

a. generate, with a computer, a functional data structure with variables for mapping the data values of the measurement and/or control systems;

b. describe, with the computer, content of the variables by means of a set of defining attributes, wherein at least one attribute contains variable references to other variables in order to map variable networks;

c. create, with the computer, each time when at least one defining variable attribute value of at least one variable has been changed by at least one of the measurement and/or control systems, a primary clone of said at least one variable; and d. create, with the computer, machine clones of the variables that lie on dependent variable network paths of the primary cloned variable, wherein the primary cloned variable, together with the machine clones of the variables that lie on the dependent variable network paths, define a non-redundant data structure.

\* \* \* \* \*